(12) United States Patent
Paratore

(10) Patent No.: US 6,243,258 B1
(45) Date of Patent: Jun. 5, 2001

(54) HAND HELD USER COMPUTER INTERFACE

(75) Inventor: Robert M. Paratore, Woodinville, WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/307,369

(22) Filed: May 7, 1999

(51) Int. Cl.$^7$ .................................................. G06F 1/16
(52) U.S. Cl. .................... 361/680; 361/681; 345/168; 235/145
(58) Field of Search .................... 361/680–682, 361/683; 341/22; 345/168–172, 905; 235/145; 400/489, 682, 691, 692, 693; 312/208.1, 208.4; 364/708.1

(56) References Cited

U.S. PATENT DOCUMENTS

| 5,103,376 | | 4/1992 | Blonder ................................. 361/822 |
| 5,224,060 | | 6/1993 | Ma ........................................ 364/708 |
| 5,241,303 | | 8/1993 | Register et al. ...................... 340/706 |
| 5,268,816 | | 12/1993 | Abell, Jr. et al. .................... 361/729 |
| 5,276,589 | | 1/1994 | Bartlett et al. ...................... 361/681 |
| 5,375,076 | * | 12/1994 | Goodrich et al. ................... 361/680 |
| 5,504,483 | * | 4/1996 | Hoffmann et al. ................... 341/22 |
| 5,548,477 | | 8/1996 | Kumar et al. ........................ 361/680 |
| 5,681,220 | * | 10/1997 | Bertram et al. ...................... 345/169 |
| 5,712,760 | * | 1/1998 | Coulon et al. ....................... 361/680 |
| 5,864,490 | | 1/1999 | Van Bost ............................. 364/708.1 |

* cited by examiner

*Primary Examiner*—Leo P. Picard
*Assistant Examiner*—Hung Van Duong
(74) *Attorney, Agent, or Firm*—O'Melveny & Myers LLP

(57) ABSTRACT

A hand held user computer interface is capable of being automatically switched between a keyboard input mode and a pen input mode. When the computer is pivoted to the pen input mode, the keyboard is automatically disabled allowing the user to grip the keyboard without concern about accidentally hitting a key. The hand held computer comprises a display portion pivotally connected to a keyboard portion by a hinge. In the keyboard input mode, the display portion is at an angle with respect to the keyboard portion. The keyboard portion is pivotable to a position underneath the display portion so that the display portion overlies the keyboard portion and faces upwards to form a comfortable writing surface. The rotation of the keyboard is detected and the computer automatically switches mode to disable the keyboard portion and activate the pen input mode. Thus, no manual knob or switch control is needed to change from keyboard input mode to pen input mode or vice versa. The hand held computer eliminates interference from the keyboard portion while in the pen input mode. The keyboard may then be used for easy gripping and keeping control. As a result, the computer design can be made small and light.

17 Claims, 3 Drawing Sheets

HAND HELD USER COMPUTER INTERFACE

BACKGROUND OF THE INVENTION

1. Field of the Invention

The present invention relates to computer systems, and particularly to hand held computers that are practical for data entry through either a keyboard input arrangement or a pen input arrangement.

2. Description of Related Art

A variety of hand held computers such as laptops and palm-top computers have become very popular and are widely used for both business and personal activities. Hand held computers typically include a keyboard portion hinged to a display portion. While user input to computing devices has been generally through a keyboard and mouse, pen computer capability (using recognition of handwritten inputs by a pen acting upon a display surface) is desirable for certain types of hand held computers, especially in mobile tasks that require a more limited extent of textual input. Mobile users often must enter data while standing, holding the computer in one hand (with the display open and firmly supported), and the pen in the other. In a sitting position, it should also be possible to use the pen with one hand while balancing the computer on the user's knee, leaving one hand free. In a particular setting, for example, hand held computers are used in business meetings for note taking purposes. Since the clicking of a keyboard may be disruptive in the meeting, a pen input arrangement allows the user to use the computer as electronic paper, thus avoiding disruptions in the meeting. Another advantage of pen computers is that non-textual information, such as drawings, graphs, or diagrams, may be recorded.

It has been recognized that a keyboard/pen arrangement would benefit many applications and users. Many hand held computers use a keyboard/pen arrangement for data entry, such as disclosed in U.S. Pat. No. 5,268,816 to Abell, and U.S. Pat. No. 5,276,589 to Bartlett. It is known in the art to use dual position display screens for keyboard/pen arrangements. When the display screen is in its substantially vertical position, the keyboard is disposed in a substantially horizontal position so that a user may view the display screen when using the keyboard to enter data. When data is to be entered through a graphics pen, the display screen is disposed in a substantially horizontal position, and the keyboard is disposed in a substantially vertical position. An example of such a system is disclosed in U.S. Pat. No. 5,103,376 to Blonder.

A problem with the known keyboard/pen computer arrangements is that the keyboard/mouse portion of the computer stays active and gets in the way when a user is entering data using a graphics pen. The user has to be careful not to hit a key accidentally, which would input erroneous data; therefore, the user cannot use the keyboard portion as a grip to keep the computer steady when using the graphics pen. This leads to computer designs that are larger in size and heavier in order to reduce the need for gripping. Since it is desired to keep the weight and size of a hand held computer to a minimum so that a user can carry the computer more easily, this increased weight and size is therefore not desirable. Another drawback of these devices is that the pen input is not automatically activated. Instead, a manual knob or a switch is needed to activate the keyboard/mouse input or the pen input.

Accordingly, a need exists to provide a simple and light-weight keyboard/pen computer interface such that the computer switches mode automatically to disable or activate the keyboard when appropriate. It would be further desirable to provide a keyboard/pen computer interface in which the keyboard does not interfere with the use of the computer when it is in a pen input mode.

SUMMARY OF THE INVENTION

In accordance with the teachings of this invention, a hand held user computer interface is provided. The hand held user computer interface can be automatically switched between a keyboard input mode and a pen input mode. When the computer is pivoted to the pen input mode, the keyboard is automatically disabled allowing the user to grip the keyboard without concern about accidentally hitting a key, thus allowing the computer design to be small and light-weight.

More particularly, the hand held computer comprises a display portion pivotally connected to a keyboard portion by a hinge. In the keyboard input mode, the display portion is substantially in a non-coplanar position with respect to the keyboard portion. The keyboard portion is rotatable about the hinge all the way around to a position in which the keyboard portion is underneath the display portion. When the keyboard portion is pivoted, the motion is detected and the computer automatically switches mode to disable the keyboard portion and activate the pen input mode. Thus, no manual knob or switch control is needed to change from keyboard input mode to pen input mode or vice versa. The hand held computer thereafter operates as an electronic notepad eliminating interference from the keyboard portion while the computer is in the pen input mode. The disabled keyboard may then be used for easy gripping of the computer, which results in a smaller and lighter computer.

A more complete understanding of the hand held user computer interface will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a hand held user computer interface that satisfies the need for a computer that can automatically be switched between a keyboard input mode and a pen input mode, thus avoiding interference by the keyboard when the computer is in the pen input mode and allowing the overall computer design to be small and light weight. In the detailed description that follows, it should be appreciated that like element numerals are used to describe like elements illustrated in one or more of the figures.

Figure 1:
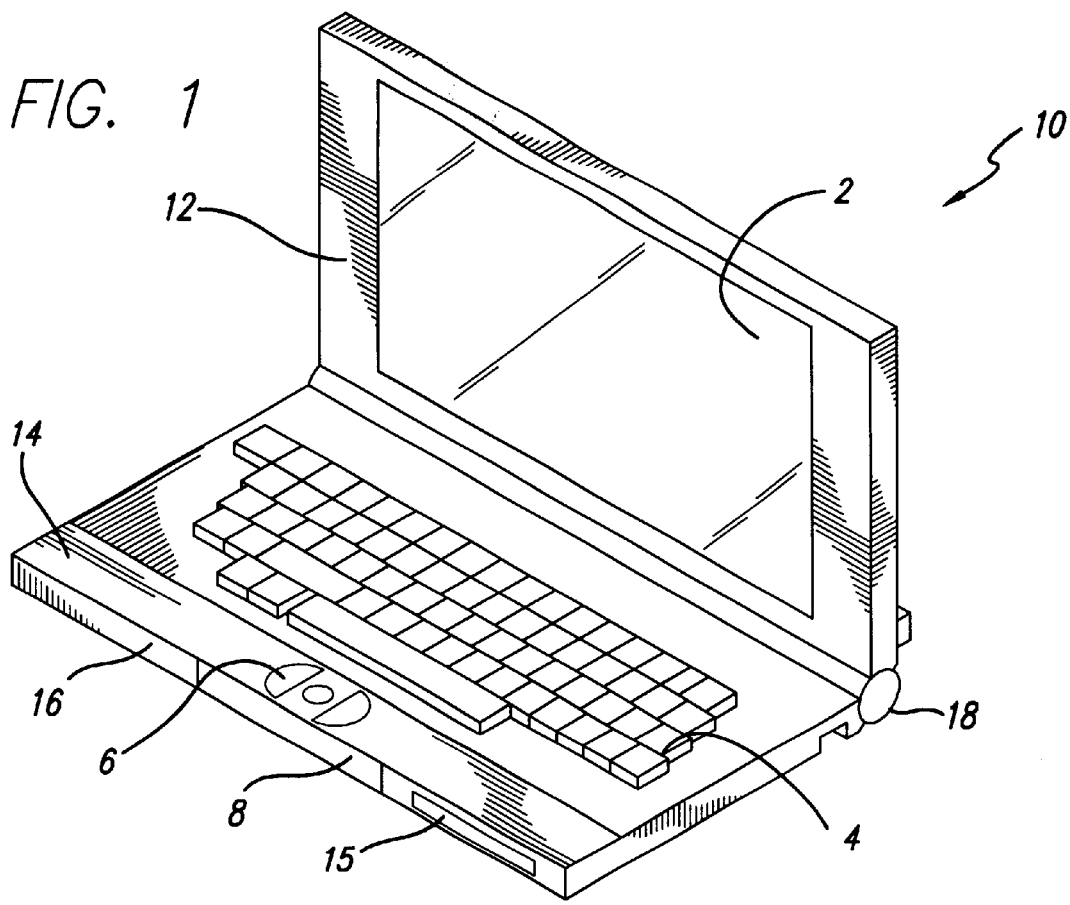
FIG. 1 is a perspective view of a hand held computer according to an embodiment of the present invention.

Referring first to FIG. 1, a perspective view of a hand held computer according to an embodiment of the present invention is provided. A hand held computer 10 as constructed in accordance with the present invention is generally comprised of an upper case 12 pivotally coupled along one edge to a lower case 14 by a hinge 18. The upper case 12 has a back side that provides the exterior case of the computer 10. The upper case 12 comprises a pen input side or display unit 2, which is preferably a liquid crystal display. The display unit 2 may further include sensing circuitry for detection of the position of a pointer, such as a pen.

Figure 2:
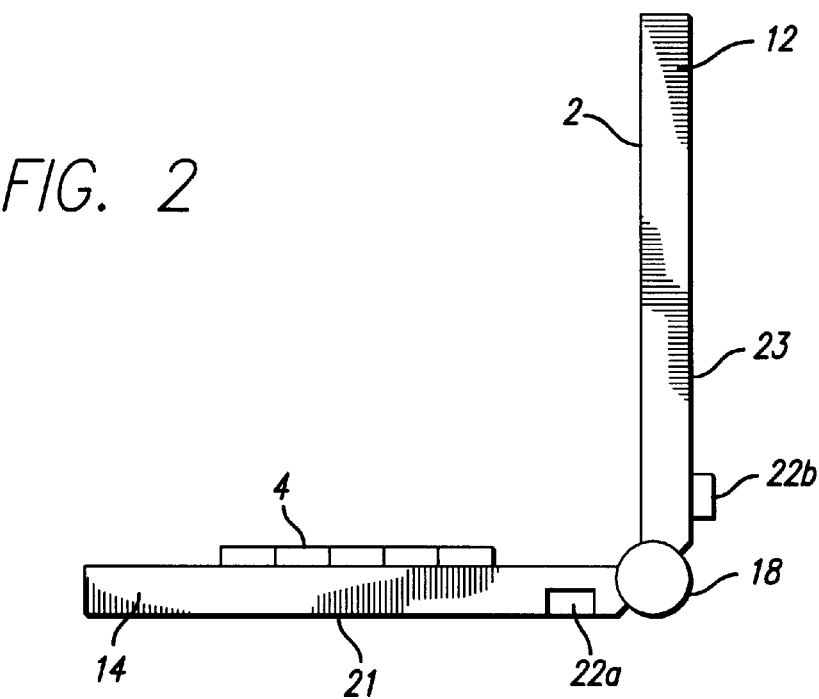
FIG. 2 is a side view of a hand held computer in a keyboard input position according to an embodiment of the present invention.

The lower case 14 generally comprises a keyboard 4 having a pointing device 6, such as a touch pad, a track ball or a mouse. As is conventional, the keyboard 4 has a plurality of alphanumeric keys each adapted to generate a character signal upon its depression. The lower case 14 may also have a hard disk drive 8, a floppy disk drive 15, a battery case 16 and a mother board assembly (not shown). The hinge 18 includes a positioning mechanism for allowing the keyboard 4 to pivot relative to the position of the display unit 2. In most instances, the hinged positioning mechanism comprises a hinged arm integrally molded to the lower case 14 and a support arm integrally molded to the upper case 12. The hinged arm and support arm are typically formed from the same tempered plastic as the case of the computer 10 and are tightly fitted such that a user has to push on the lower case 14 in order to cause it to pivot. Electronic circuitry usually spans the hinged positioning mechanism in order to allow the keyboard to communicate with the display. In a keyboard input mode, the pivoting motion of the display unit 2 is limited to a substantially non-coplanar position as shown in FIG. 2. In a pen input mode, the keyboard is allowed to pivot and extend all the way back to a position in which the display unit 2 is in a substantially horizontal position to overlie the keyboard 4, as shown in FIG. 3.

Referring now to FIG. 2, a side view of a hand held computer in a keyboard input position according to an embodiment of the present invention is provided. The upper case 12 is substantially in a non-coplanar position with respect to the lower case 14 so that a user can easily use the keyboard to input data as is conventional. The lower case 14 has a bottom wall 21, on which a switch 22a is located near hinge 18. The upper case 12 has a back wall 23, on which a bracket 22b is located directly opposite switch 22a. It should be noted that switch 22a may be located within hinge 18 or anywhere along the bottom wall 21 of the lower case 14 with bracket 22b located in a corresponding position on the back wall 23 directly opposite switch 22a. In this position, switch 22a and bracket 22b are not in contact with each other and the keyboard is active in an operational orientation. The switch 22a is depressible and operatively connected to the computer circuitry within the lower case 14.

Figure 3:
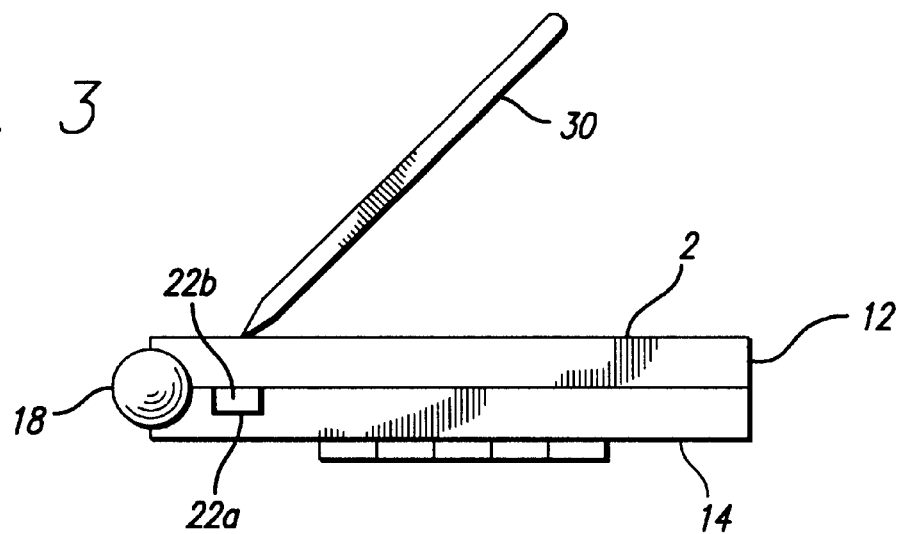
FIG. 3 is a side view of a hand held computer in a pen input position according to an embodiment of the present invention.

Referring now to FIG. 3, a side view of a hand held computer in a pen input position according to an embodiment of the present invention is provided. For data entry using a pen, the lower case 14 is extended back all the way around to a position underneath the upper case 12. The upper case 12 overlies the lower case 14, thus the display unit 2 faces upwards in order to form a comfortable writing surface.

For use with the display unit 2, a pen 30 is provided that may have an elongated cylindrical configuration. It is envisioned that data can be entered into the computer by literally writing the data across the display screen using the pen 30. The pen 30 may be active and contain electronic circuits, or purely passive and function as a conductive element to contact a matrix of conductors, or even a mechanical element to contact a two-dimensional-sensing surface at a certain point. An active pen may further include a cabled link to the computer 10, or may have a wireless data link. If a purely passive pen is used, position-sensing circuits are located in the display unit 2. It should be noted that the display unit 2 may be responsive to other screen input devices as known in the art, such as a finger of a user.

In this position, the switch 22a is depressed when the lower case pivots to a position underneath the upper case such that the upper case overlies the lower case. This causes the switch 22a and the bracket 22b to engage each other and the keyboard to be automatically disabled in a non-operational orientation. Thus, there is no need for a manual knob or switch control to change from keyboard input mode to pen input mode. The user can easily hold the computer in one hand and the pen in the other hand. When the computer is in the pen input mode, the user can grip the computer without concern of inputting erroneous data by hitting the keys of the disabled keyboard. The keys of the keyboard may be evenly spaced or recessed into the plane of the lower case so that the computer sits more stable if the user desires to use the computer on top of a working desk or table.

It should be noted that there are numerous ways of automatically activating or disabling the keyboard. In addition to using a mechanical switch, the keyboard connection may be internally switched to ground, a reed switch with a magnetic contact may be used, a mercury switch may be used, or an optical detection sensor may be used in the same way as switch 22a. The alternative switches may be connected within the lower case and would detect when the position of the lower case is in a position underneath the display portion, thereby disabling the keyboard. For example, a position sensor provides signals indicative of the position of the moving lower case with which it is associated relative to some fixed datum. The sensor may automatically detect the upper case position when the upper case is within the object detection field by sensing object sensing energy reflected off the upper case.

Figure 4:
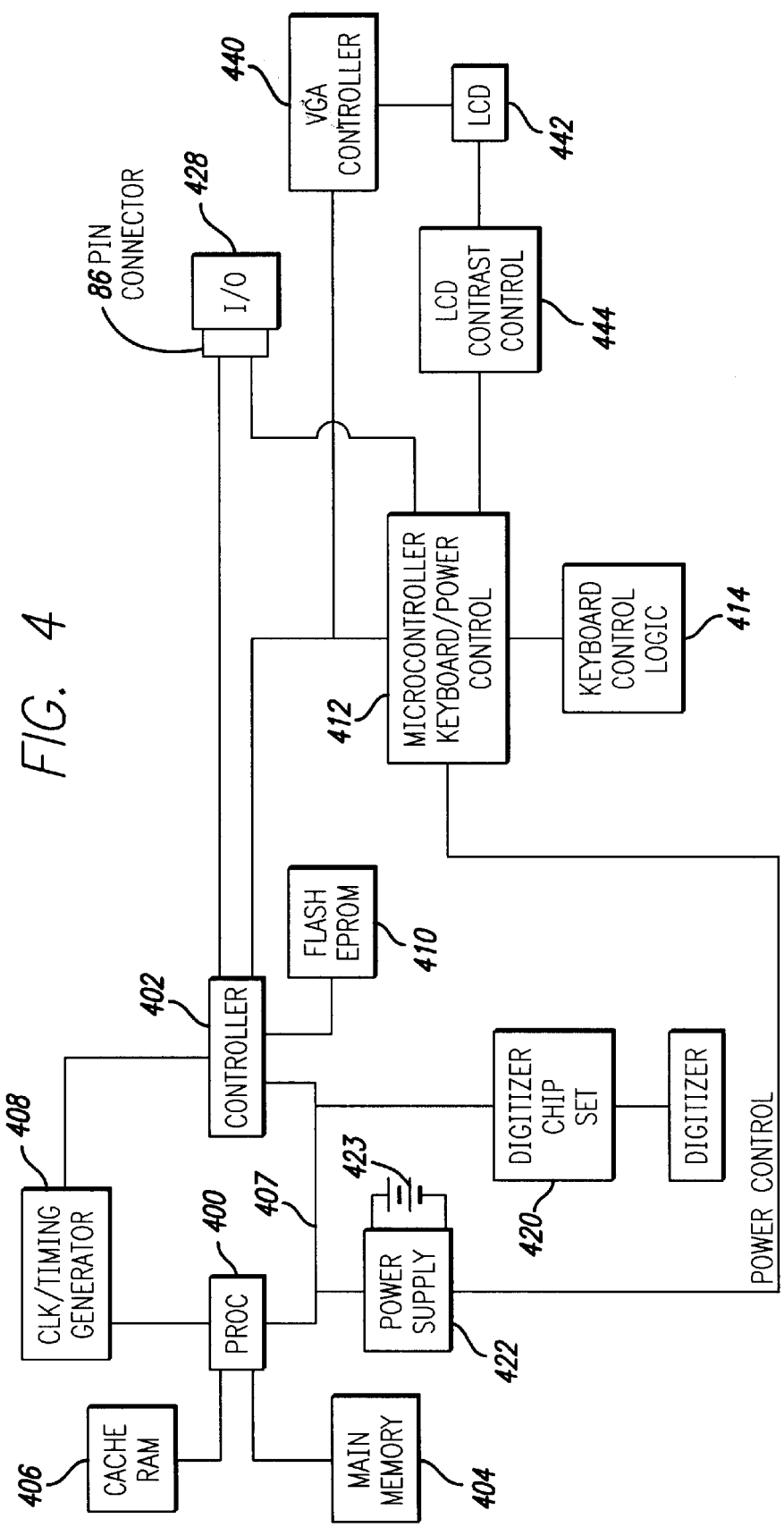
FIG. 4 shows a simplified schematic diagram of an exemplary electronic organization of internal hardware for a keyboard and pen input computer.

Referring now to FIG. 4, a simplified schematic diagram of an exemplary keyboard and pen input computer is provided. The computer comprises a processor 400, a controller 402, a clock/timing generator 408, a cache random access memory (RAM) 406, a main memory 404, a power supply 422, a battery 423, a Flash erasable programmable read only memory (EPROM) 410, a digitizer chip set 420, a microcontroller 412, a keyboard control logic 414, a liquid crystal display (LCD) contrast control 444, a VGA controller 440, an LCD 442, and an input/output (I/O) slice 428. It should be noted that this is only a partial list of the components included in the computer. The processor 400 is connected to the main memory 404 and the cache RAM 406. The processor 400 receives a clock input from the clock/timing generator 408. The controller 402 is connected to receive clock line SYSCLK from the processor 400, and a clock signal from the clock/timing generator 408. The controller 402 includes an internal bus interface logic, which is connected to bus 407. The Flash EPROM 410 is connected to the controller 402 and contains code for a basic input output system (BIOS) and for an operating system.

The microcontroller 412 is also connected to the controller 402 and receives keyboard inputs through associated control logic 414. The keyboard control logic 414 receives an input signal through the controller 402 when switch 22a and bracket 22*b* are in contact with each other to disable the keyboard when it is pivoted to a position underneath the display unit, as shown in FIG. 3.

The microcontroller 412 is also connected to the LCD contrast control logic 444. This logic, together with video signals from the VGA controller 440, controls the LCD 442. Connected to bus 407 is an optional interface logic (not shown), which can be connected to a modem or a local area network (LAN) interface card. Also connected to bus 407 is the digitizer chip set 420, which is connected to detect and measure the movements of the computer's pen. The power supply 422 is connected to bus 407 and is driven by battery 423. The I/O slice 428 plugs into the side of the computer 10 using an 86 pin connector, for example. This connector expansion unit provides industry-standard connectors for serial ports, parallel ports, SCSI interface, and for optional docking to external display and/or keyboard units.

Figure 5:
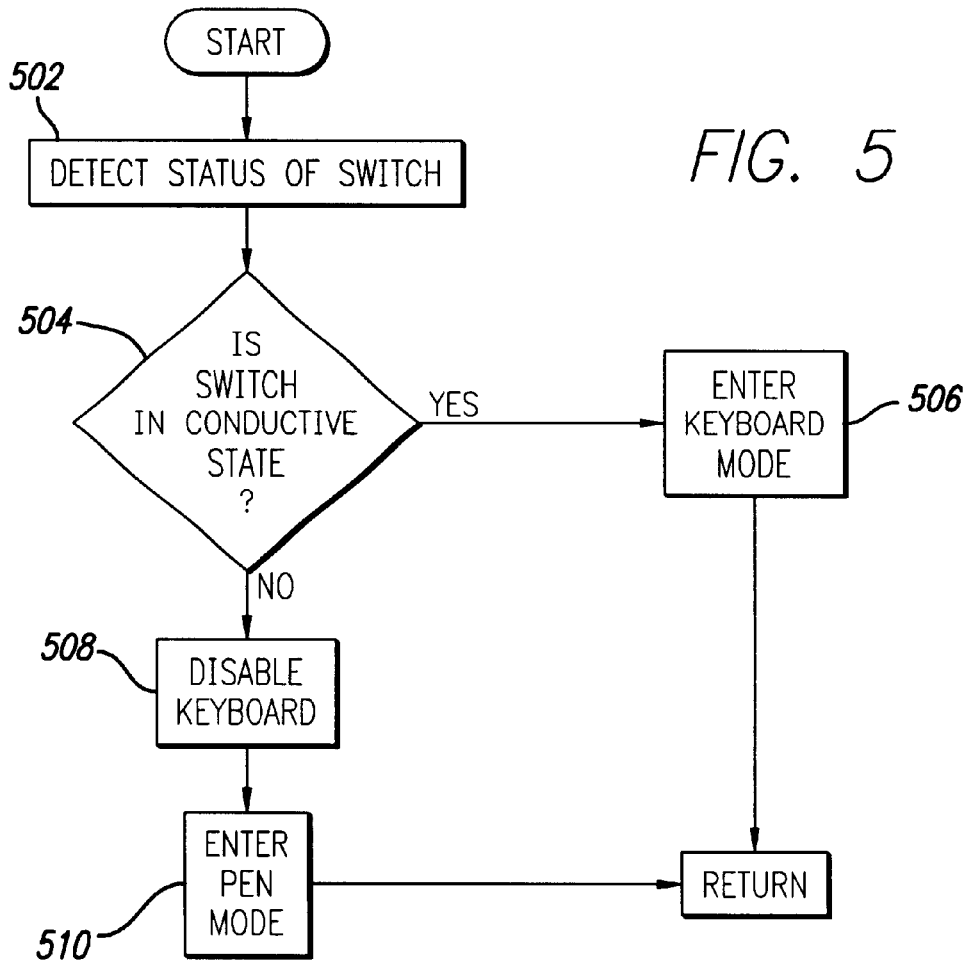
FIG. 5 shows a flowchart of a process for recognizing a keyboard input mode or a pen input mode according to an embodiment of the present invention.

Referring now to FIG. 5, a flowchart of the process for recognizing a keyboard input mode or a pen input mode according to an embodiment of the present invention is provided. In step 502, the processor detects the status of switch 22*a*. In step 504, if the processor recognizes that the switch 22*a* is in a conductive state, for example by detecting a current value or a zero voltage value across the switch, which corresponds to a closed switch position, the process goes to step 506. If the processor recognizes that the sensor switch 22*a* is in a non-conductive state, for example by detecting a zero current value or a voltage value across the switch corresponding to an open switch position, the process goes to step 508. In step 506, the processor enters the keyboard input mode. In step 508, the keyboard is disabled, and in step 510, the processor enters the pen input mode.

It should now be apparent that the keyboard 4 pivots between an orientation that may be called its non-operational position underneath display unit 2 as shown in FIG. 3, and an orientation that may be called its operational position, at an angle with respect to display unit 2 as shown in FIG. 2. Inasmuch as the keyboard 4 and display unit 2 require only a simple motion to move between operational and non-operational orientations, the use of the computer in pen input mode is facilitated and the difficulties of the prior art regarding keyboard interference are avoided.

Having thus described a preferred embodiment of a hand held user computer interface, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A hand held computer comprising:

a main body portion including an integrated keyboard;

a display portion including an integrated display;

a hinge pivotally connecting said main body portion and said display portion wherein said display portion is pivotable between a keyboard enabled position and a keyboard disabled position, wherein in said keyboard enabled position, said main body portion is substantially non-coplanar with respect to said display portion enabling said main body portion to lie on a flat surface with said display portion angled to facilitate viewing by an operator, and in said keyboard disabled position, said main body portion is coplanar with respect to said display portion enabling said main body portion to be disposed behind said display portion with said integrated keyboard facing downward and said integrated display facing upward;

a switch adapted to detect said main body portion pivoted to said keyboard disabled position; and a processor connected to said switch, said processor adapted to automatically disable operation of said integrated keyboard upon detection by said switch of said main body portion pivoted to said keyboard disabled position, whereby said integrated keyboard does not interfere with operation of said integrated display as a pen-based input device when said main body portion is in said keyboard disabled position.

2. The hand held computer of claim 1, wherein said integrated display further comprises pen input circuitry adapted to allow data entry as said pen-based input device.

3. The hand held computer of claim 1, further comprising a pen that includes active electronic circuitry, wherein said integrated display is responsive to data inputted by said pen.

4. The hand held computer of claim 1, wherein said switch further comprises a sensor.

5. The hand held computer of claim 3, wherein said pen is connected to said computer via a cable.

6. The hand held computer of claim 3, wherein said pen is connected to said computer via a wireless communication link.

7. A hand held computer comprising:

a main body portion including an integrated keyboard;

a display portion including an integrated display;

means for connecting said main body portion and said display portion, said connecting means allowing said display portion to pivot selectively with respect to said main body portion so as to alter an angle between said integrated keyboard and said integrated display, wherein a keyboard disabled position is defined in which said display portion is pivoted to be substantially coplanar with said main body portion such that said integrated keyboard and said integrated display face in opposite directions; and means for disabling said integrated keyboard upon said display portion being pivoted to said keyboard disabled position, said integrated keyboard remaining operable in all other relative positions of said main body portion and said display portion.

8. The hand held computer of claim 7, wherein said connecting means further comprises a pivoting hinge.

9. The hand held computer of claim 7, wherein said disabling means further comprises a switch.

10. The hand held computer of claim 7, wherein said disabling means further comprises a sensor.

11. The hand held computer of claim 7, wherein said disabling means further comprises a processor adapted to execute a stored program to detect said keyboard disabled position.

12. The hand held computer of claim 7, further comprising pen input circuitry connected to said integrated display for data entry.

13. The hand held computer of claim 7, further comprising a pen that includes active electronic circuitry, wherein said integrated display is responsive to data inputted by said pen.

14. The hand held computer of claim 13, wherein said pen is connected to said computer via a cable.

15. The hand held computer of claim 13, wherein said pen is connected to said computer via a wireless link.

16. In a hand held computer comprising a main body portion having an integrated keyboard and a display portion having an integrated display, said display portion being pivotable with respect to said main body portion, a method comprises the steps of:

detecting that said display portion has pivoted to a substantially coplanar position with respect to said main body portion such that said integrated keyboard and said integrated display face in opposite directions;

disabling said integrated keyboard when said display portion is pivoted to said coplanar position; and enabling said integrated keyboard when said display portion is pivoted to all positions other than said coplanar position.

17. The method of claim 16, further comprising the step of enabling a pen input device when said display portion is pivoted to said coplanar position.

* * * * *